Nov. 3, 1970     S. H. BAKER     3,537,177

OPERATING MECHANISM FOR POWER DRIVEN CAN OPENERS

Filed July 25, 1968     2 Sheets-Sheet 1

INVENTOR.
SLADE H. BAKER

BY *Williamson, Palmatier & Bains*

ATTORNEY.

INVENTOR.
SLADE H. BAKER
BY Williamson, Palmatier
& Bains
ATTORNEYS

# United States Patent Office 3,537,177
Patented Nov. 3, 1970

3,537,177
OPERATING MECHANISM FOR POWER DRIVEN CAN OPENERS
Slade Hale Baker, 210½ N. Front St., Mankato, Minn. 56001
Filed July 25, 1968, Ser. No. 747,745
Int. Cl. B67b 7/38
U.S. Cl. 30—4                                6 Claims

ABSTRACT OF THE DISCLOSURE

A drive mechanism particularly adapted for use in can openers having a worm gear driven by a pair of worm drive shafts in engagement with opposite sides of its periphery and mounted on a power output shaft journalled in a shiftable support member, the worm gear being movable in opposite directions in a planar path by connecting one of said worm drive shafts to a rotary power source while holding the other worm shaft stationary. As the worm gear is being driven by the rotating worm shaft it moves along the stationary worm shaft and carries with it the aforesaid power output shaft and shiftable support member. The drive wheel of a can opener may be mounted on the aforesaid power output shaft and shifted into engagement with the bead of a can lid so as to puncture the lid against a cooperating rotary cutter and start the can revolving to carry out the lid-cutting operation. An operating lever serves to engage a first clutch assembly to transmit rotary power to one of the worm drive shafts, and as the aforesaid support member is shifted by the rolling movement of the worm gear along the other stationary worm shaft, it functions to engage a second clutch assembly to start the second worm shaft rotating, both worm shafts cooperating to drive the worm gear after the drive wheel has been shifted to accomplish the puncturing of the can lid.

---

The gear drive mechanism of this invention is particularly characterized by the unique arrangement of a pair of spaced-apart, worm drive shafts in driving engagement with opposite sides of a worm gear, the worm drive shafts rotating in opposite directions and cooperating to provide an excess amount of power for the driven worm gear.

A particularly beneficial aspect of my invention resides in the journalling of a rotary, power output shaft connected to the worm gear in a bearing mounted on a shiftable support member, this arrangement permitting the output shaft support member to move with the worm gear as it rolls along one of the worm drive shafts which is held stationary as the other worm shaft rotates the worm gear. Although the rolling movement of the worm gear and the shifting of its output shaft and support member therewith could be used for a variety of purposes such as the actuation of control elements in mechanisms of various types, my unique drive mechanism is particularly adapted for rotating the drive wheel of a can opener and carrying it into engagement with the bead on the top of a can to be opened. In such applications the can opener drive wheel would be secured to the aforesaid rotary output shaft so that it will shift therewith and act to press the lid of a can against a cooperating cutter wheel so as to puncture the can lid.

As a further advantageous feature of my invention I provide separate clutch assemblies for transmitting rotary power to either one of the aforesaid worm drive shafts, whereby the worm gear may be made to roll in opposite directions depending upon which one of the worm shafts is rotated by engaging one or the other of the clutch assemblies. In the preferred embodiment of my invention wherein the drive mechanism is utilized in a power can opener, an operating lever is employed to engage one clutch assembly to start the worm gear rotating and rolling along the other stationary worm shaft to effect the puncturing of a can lid in the aforesaid manner. An actuating arm carried on the shiftable member which supports the worm gear output shaft serves to engage the second clutch assembly to start the second worm shaft rotating, thereby supplying a maximum amount of power to the drive wheel on the output shaft to rotate the can and complete the lid-cutting operation.

These and other objects and advantages of my invention will become readily apparent as the following description is read in conjunction with the accompanying drawings wherein like reference numerals have been used to indicate like elements throughout the several views, and wherein.

Figure 1:
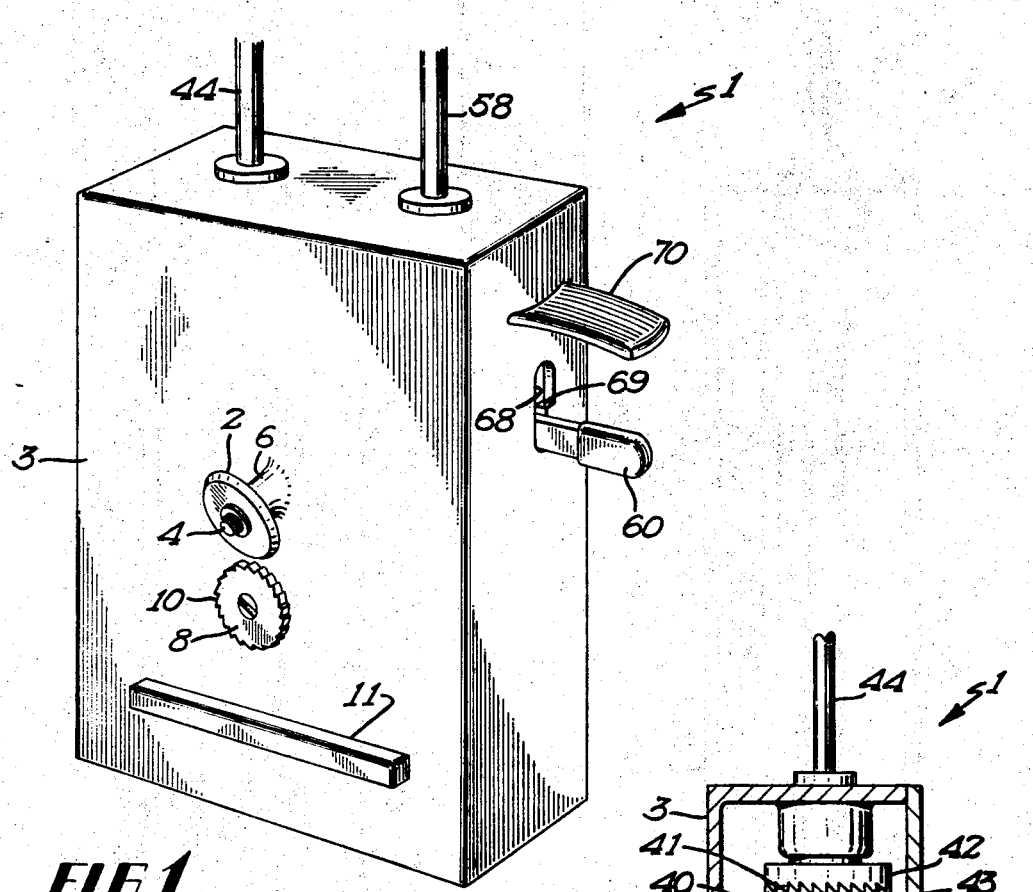
FIG. 1 is a perspective view of a can opener employing my unique drive mechanism.
Figure 3:
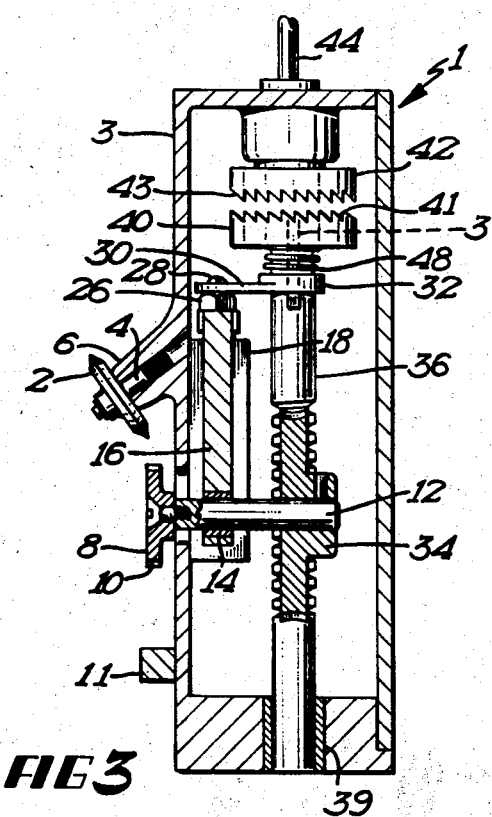
FIG. 3 is a vertical, section view taken along lines 3—3 of FIG. 2.
Figure 2:
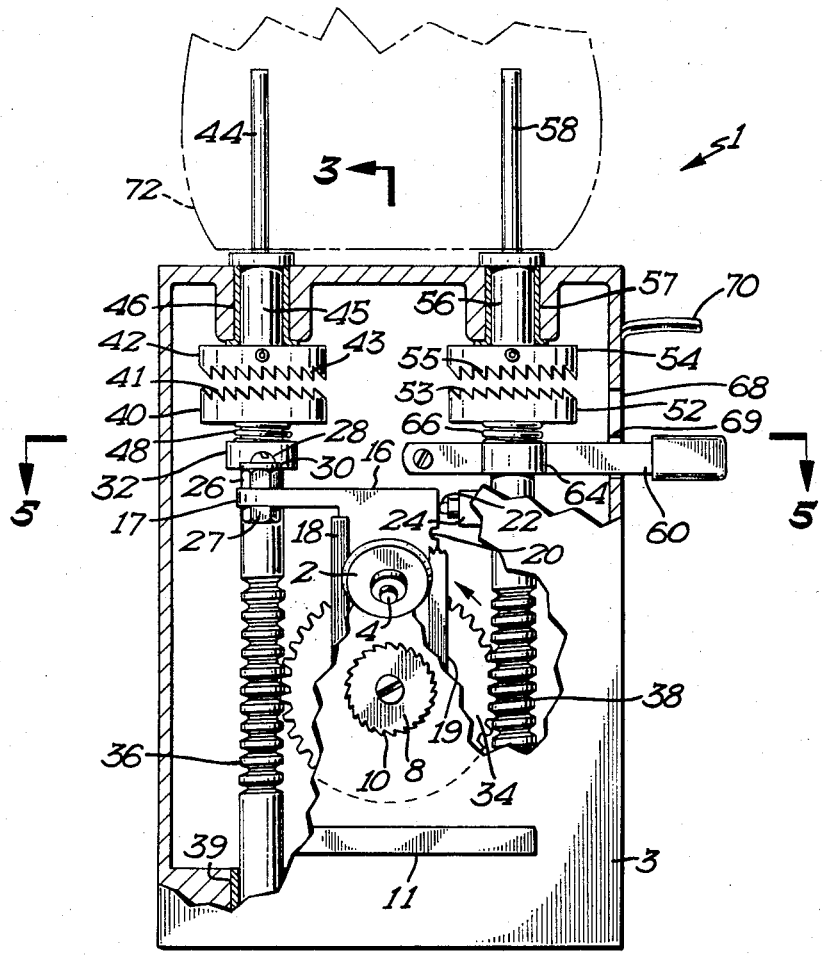
FIG. 2 is a front, elevation view of the can opener of FIG. 1 with portions thereof in section to clearly show the gear drive arrangement of this invention.

As noted above, the drive mechanism of this invention has been particularly designed with a view towards improving the operation of a power can opener. For illustrative purposes, I have shown in FIG. 1 a can opener 1 of the type with which my improved gear drive arrangement may be employed. Referring now to FIGS. 1 and 2, I have shown on can opener 1 a rotary cutting wheel 2 of the conventional type which is rotatably supported on a shaft 4 which is secured within tubular projection 6 extending outwardly from the front face of can opener 1. Disposed below cutter 2 is a drive wheel 8 having a knurled peripheral surface 10, drive wheel 8 being mounted on rotary output shaft 12 in the manner shown in FIG. 3. Drive wheel 8 functions to engage the peripheral bead on the lid of a can to accomplish a puncturing and cutting operation in a manner hereinafter explained. Rub bar 11 on the front face of can opener 1 below drive wheel 8 serves to hold the side wall of a can outwardly so that it does not contact rotating drive wheel 8 and so that the can will be oriented in such a way as to permit the proper engagement of drive wheel 8 and cutter 2 therewith.

Output shaft 12 is rotatably supported in a bearing 14 mounted on a shiftable support member in the form of push plate 16. As is most clearly shown in FIGS. 2, 3 and 5, plate 16 is slidably supported within vertical runners 18 and 19 which are secured to the inside surface of front wall 3 of can opener 1 as by welding. Plate 16 is moved up and down by the action of the gear drive mechanism of this invention in a manner explained hereinafter; and recess 20 in the side edge of plate 16 engages a spring loaded poppet 22 to hold plate 16 in a predetermined, elevated position. Poppet element 22 is slidably housed within bracket member 24 mounted on front wall 3 of can opener 1. Depending laterally from plate 16 is an actuating arm 17 having a hole at its outer end through which bolt 26 extends. Nut 27 holds bolt 26 in place, and link 30 is attached to the top of bolt 26 by screw 28 which is threadedly seated in a recess machined in the head of bolt 26. Link 30 has a collar 32 on its inner end which may be shifted up and down on worm drive shaft 36 to engage and disengage a clutch assembly as explained below.

The drive mechanism for imparting rotary motion to output shaft 12 is comprised of a worm gear 34 and two, spaced-apart worm drive shafts 36 and 38. These elements are arranged in the manner shown in FIGS. 2, 3 and 5 with worm shafts 36 and 38 positioned adjacent opposite, peripheral edge portions of worm gear 34 in driving engagement therewith. Worm shaft 36 is rotatably supported at its lower end in bearing 39 mounted in the bottom wall of can opener 1. Slidably mounted on the upper end of worm shaft 36 are collar 32 and clutch plate or disc 40, these elements being guided and restrained against rotational movement by a spline or key 37 shown in FIGS. 3 and 5. Teeth 41 on the upper face of clutch disc 40 are arranged and contoured to mesh with mating teeth 43 on driving clutch disc 42. Teeth 41 and 43 are very sharply angled to the contour shown in FIGS. 2 and 3 so that they will quickly and easily slip in place under the pressure exerted when bringing clutch discs 40 and 42 into engagement with each other. Upper, driving clutch disc 42 is secured to lower end 45 of power input shaft 44 for rotation therewith, shaft section 45 being journalled in bearing 46 mounted in the top wall of the housing for can opener 1 as shown in FIG. 2. Collar 32 and clutch disc 40 are separated by compression spring 48 coiled around worm shaft 36.

Figure 5:
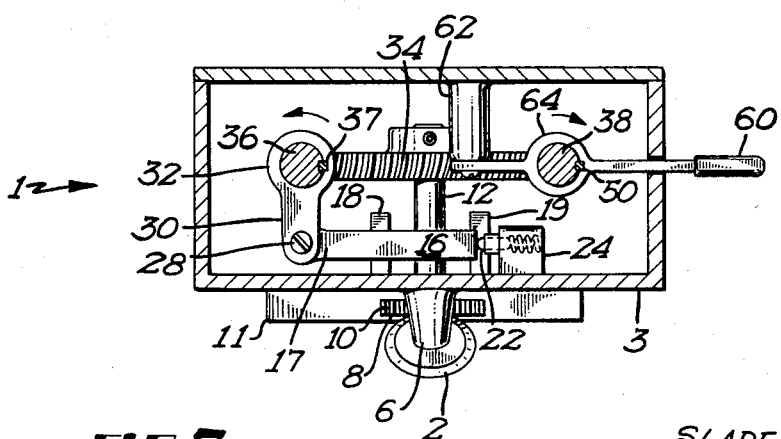
FIG. 5 is a horizontal, section view of the can opener of FIG. 1 taken along lines 5—5 of FIG. 2 providing a top, plan view of the internal, operating parts.

Worm drive shaft 38 is also rotatably supported at its lower end in a bearing (not shown) mounted in the base of can opener 1. Referring now to FIGS. 2 and 5, a spline or key 50 on the upper end of worm shaft 38 serves to guide and hold a clutch disc 52 slidably mounted on the upper end of shaft 38. Teeth 53 on the upper face of clutch disc 52 are constructed and arranged to mesh with mating teeth 55 on drive clutch disc 54, teeth 53 and 55 being of the same design and configuration as those shown at 41 and 43 on clutch discs 40 and 42. Clutch disc 54 is mounted on lower shaft extension 56 of power input shaft 58, and shaft section 56 is journalled in bearing 57 at the top of can opener 1. For the purpose of engaging and disengaging the clutch assembly comprises of clutch discs 52 and 54, I provide an operating lever 60 which is pivotally supported at its inner end on a boss projecting inwardly from the back wall of can opener 1. A collar 64 formed as an integral part of operating lever 60 is slidably positioned on worm shaft 38 and is separated from clutch disc 52 by a compression spring 66. Spring 66 urges operating lever 60 downwardly to a position where it engages the base of guide slot 68 in the side wall of can opener 1. Operating lever 60 projects through slot 68 as is indicated in FIGS. 1 and 2 and is held on shoulder 69 of slot 68 when raised to move clutch disc 52 into engagement with drive disc 54. To provide convenience and leverage for the operator when lifting lever 60 upwardly against spring 66 I provide a thumb rest 70 on which the operator may place his thumb when gripping lever 60 by his forefinger.

Rotary power may be supplied to input shafts 44 and 58 by any convenient power source. Can opener 1 could be provided with a self-contained power source in the form of separate, selectively operable electric motors directly connected to worm shafts 36 and 38. One of the motors could be controlled by a switch actuated by lever 60, and the other motor could be operated by a switch actuated in response to the shifting of support plate 16. In the preferred embodiment of my invention I utilize an external power source connected to input shafts 44 and 58. As a particularly beneficial feature of can opener 1, I have sized and spaced power input shafts 44 and 58 so that they might be easily connected to the power unit or head 72 of a conventional household mixer, mixer power head 72 being shown in phantom lines in FIG. 2. The unique gear drive arrangement consisting of worm gear 34 and worm drive shafts 36 and 38 is so compact that the can opener in which this drive mechanism is installed may be quite small and thus readily attached to the power unit of a mixer. Such a small can opener of the general configuration which I have shown in FIG. 1 would be particularly suitable for such applications as opening soup cans, and could be mounted directly on a soup vending machine.

Figure 4:
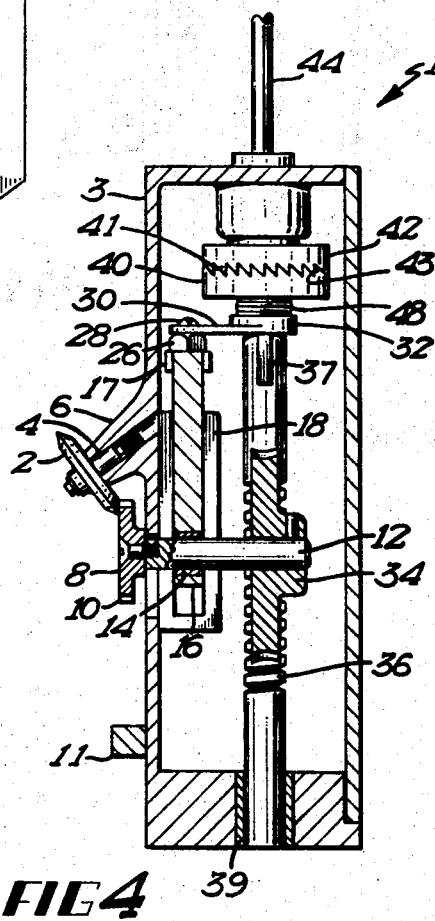
FIG. 4 is a section view similar to FIG. 3 but showing the operating elements in the position they will assume after the worm gear has rolled to a predetermined position from that shown in FIG. 3.

In operation, a can to be opened would be held in place against rub bar 11 with the peripheral edge of its lid engaging the underside of cutting wheel 2. Operating lever 60 will then be raised upwardly and brought to rest on shoulder 69 of slot 68. The upward movement of lever 60 will carry slide collar 64 upwardly over splined shaft 38, thereby compressing spring 66 and forcing clutch disc 52 upwardly into engagement with driving disc 54. With clutch discs 52 and 54 engaged, rotary power will be transmitted from input shaft 58 to worm drive shaft 38, and as shaft 38 rotates it will start work gear 34 rotating in the direction indicated by the arrows in FIG. 2. Drive wheel 8, being connected to worm gear 34 through power output shaft 12 will also start rotating. At this time drive wheel 8, shaft 12 and worm gear 36 will be in the positions shown in FIG. 3. Since worm drive shaft 36 is still stationary at this time, worm gear 34 will roll upwardly along shaft 36 to the position shown in FIG. 4, carrying output shaft 12 and drive wheel 8 with it. As drive wheel 8 is shifted upwardly to the position shown in FIG. 4, it will engage the bead on the lid of the can and press the lid against cutter 2, thereby puncturing the can lid. Since output shaft 12 is journalled in shiftable support plate 16, shaft 12 will slide plate 16 upwardly within runners 18 and 19 as worm gear 34 rolls upwardly on shaft 36. The upward movement of actuating arm 17 on plate 16 will raise link 30 and slide collar 32 thereof. Slide collar 32 will push compression spring 48 against clutch disc 40 and shift disc 40 upwardly to a point where it engages and meshes with drive disc 42. The further upward movement of collar 32 will compress spring 48 which will then serve to hold clutch discs 40 and 42 in tight contact with each other. Since power is now being supplied to input shaft 44, the engagement of clutch discs 40 and 42 will transmit rotary power to worm shaft 36. As drive shaft 36 rotates in a direction opposite from that in which worm shaft 38 is rotating it will assist in driving worm gear 34, and the cutting of the can lid will be completed as drive wheel 8 continues to rotate and revolve the can against cutting wheel 2.

When the lid of the can has been cut around its entire periphery, operating lever 60 will be moved downwardly by the operator to the bottom of slot 68 so as to disengage clutch disc 52 from drive disc 54. Worm shaft 38 will then stop rotating. Since worm shaft 36 is continuing to rotate at this time, a worm gear 34 will continue to revolve and will roll downwardly on stationary worm shaft 38. Output shaft 12 and drive wheel 8 will be carried downwardly with worm gear 34 whereupon the can will be released from cutter 2. As output shaft 12 and drive wheel 8 reach the lower position shown in FIG. 3, the accompanying downward movement of shiftable plate member 16 will carry link 30 and clutch actuating collar 32 downwardly therewith. Clutch disc 40 will then slide down splined shaft 36 out of engagement with driving disc 42, thereby removing rotary power from worm drive shaft 36, and the unit will stop.

Those skilled in the art will readily appreciate that the worm gear drive engagement described above will have a variety of useful applications, including the shifting of actuating elements of control mechanisms. By using the drive mechanism in the particular way that I have shown and described in a can opener, a can may be punctured by the power shifting of drive wheel 8 to force the can lid against cutter 2. This power puncturing feature is in contrast with prior art designs which conventionally employ a shiftable cutting wheel which must be moved manually to puncture the lid of a can. The dual, worm drive shaft arrangement also insures the application of maximum power to the drive wheel, resulting in a quick, clean and complete cutting operation. Also, the use of separate clutch assemblies for each of the worm drive shafts 36 and 38 permits the selective rotation of worm shafts 36 and 38 by operating lever 60 and actuating arm 17 in the manner described above to cause worm gear 34 to roll upwardly or downwardly on the worm shaft which remains stationary. The downward movement of worm gear 34 advantageously utilizes the power supplied by input shaft 44 to disengage drive wheel 8 from the can being opened, thus precluding the necessity of manually lifting cutter wheel 2 from the lid of a can as is the case with respect to prior art can openers.

I contemplate that various changes may be made in the form, details, arrangement and proportions of the various parts which I have shown and described without departing from the spirit and scope of my invention as defined by the following claims.

What is claimed is:

1. A drive arrangement for a power can opener comprising:
    a worm gear secured to an output shaft rotatably supported on a shiftable member;
    a pair of spaced-apart, worm drive shafts disposed adjacent opposite, peripheral edge portions of said worm gear in driving engagement therewith;
    power means including a pair of selectively operable power sources operably associated with said worm drive shafts for imparting oppositely directed, rotary power to said worm drive shafts, whereby said drive shafts rotate in opposite directions and cooperate in driving said worm gear, said worm gear, worm drive shafts and power means being components of a can opener;
    means for actuating one of said power sources so as to rotate one of said worm drive shafts while the other one of said worm shafts remains stationary, whereby said worm gear will be rotated by said one of said worm drive shafts and will simultaneously roll in a planar path along said other stationary worm shaft, therewith; and further including
    a rotary cutter and a drive wheel, said drive wheel being mounted on said output shaft so as to be rotatable and shiftable therewith, the rotation and rolling movement of said worm gear by said one drive shaft serving to shift said drive wheel into a position wherein it engages the bead of a can lid and forces it against said cutter to puncture said lid, the cutting operation being completed as the drive wheel rotates with said output shaft and revolves said can against said cutter.

2. In a power can opener having a rotary cutter and a drive wheel for revolving a can with its lid against said cutter, an improved operating mechanism for said drive wheel comprising:
    a shiftably supported, power output shaft having said drive wheel mounted thereon for rotation therewith;
    means for shifting said output shaft from a first position to a second position in which it carries said drive wheel into driving engagement with the bead of the lid of a can, the movement of said drive wheel accomplishing the puncturing of said can lid by forcing the lid against said cutter; and
    a gear drive mechanism comprising a worm gear connected to said power output shaft for imparting rotary motion thereto and two worm drive shafts between which said worm gear is positioned in engagement therewith; and
    power input means operatively associated with said worm drive shafts in such a way as to drive said shafts in opposite directions, whereby said oppositely rotating worm drive shafts will cooperate in imparting maximum rotary power to said worm gear.

3. Apparatus as defined in claim 2 wherein: said power input means includes separate, selectively operable power sources operatively associated with each of said worm drive shafts, whereby one of said worm drive shafts may be driven to rotate said worm gear and thereby cause said worm gear to roll along the other, stationary one of said worm drive shafts to accomplish said shifting of said output shaft from said first position to said second position.

4. Apparatus as defined in claim 3 wherein:
    each of said selectively operable power sources comprises a clutch assembly connected to a power input shaft for transmitting rotary power to each of said worm drive shafts, one of said clutch assemblies including a driving clutch disc mounted on one of said power input shafts and a mating, driven clutch disc slidably supported on one of said worm drive shafts; and
    an operating lever for sliding said driven clutch disc in and out of engagement with said driving clutch disc to stop and start said one, worm drive shaft.

5. Apparatus as defined in claim 4 wherein:
    the other one of said clutch assemblies includes a driving clutch disc mounted on a power input shaft and a mating, driven clutch disc slidably supported on the other one of said worm drive shafts; and
    further including a shiftable support on which said power output shaft is rotatably supported, said shiftable support being operatively associated with actuating means constructed and arranged to slide said driven clutch disc into engagement with said driving clutch disc to start said other one of said worm drive shafts rotating in response to the shifting of said output shaft to said second position.

6. Apparatus as defined in claim 3, and further including:
    operating means for actuating one of said power sources to start one of said worm drive shafts rotating; and
    actauting means operative to actuate the other one of said power sources to start the other one of said worm drive shafts rotating in response to the shifting of said output shaft to said second position, said actuating means serving to stop said other worm drive shaft after said one worm shaft has been stopped by said operating means and said worm gear has rolled back therealong to return said output shaft to said first position.

References Cited
UNITED STATES PATENTS
2,710,444   6/1955   Ripperger _____ 30—4

OTHELL M. SIMPSON, Primary Examiner

G. F. GRAFEL, Assistant Examiner

UNITED STATES PATENT OFFICE
CERTIFICATE OF CORRECTION

Patent No. 3,537,177　　　　　　　　Dated November 3, 1970

Inventor(s) Mr. Slade H. Baker

It is certified that error appears in the above-identified patent and that said Letters Patent are hereby corrected as shown below:

In claim 1, column 5, after line 41 and after "shaft," insert --carrying said output shaft and shiftable member--.

SIGNED AND
SEALED
JAN 19 1971

(SEAL)
Attest:

Edward M. Fletcher, Jr.
Attesting Officer

WILLIAM E. SCHUYLER, JR.
Commissioner of Patents

FORM PO-1050 (10-69)　　　　　　　　　　　　　　　　　　　　USCOMM-DC 60376-P69